(12) United States Patent
Murray et al.

(10) Patent No.: US 9,051,987 B2
(45) Date of Patent: Jun. 9, 2015

(54) STRUT WEAR BANDS

(71) Applicant: Caterpillar Inc., Peoria, IL (US)

(72) Inventors: Robert David Murray, Shorewood, IL (US); Seth Johnson, Plainfield, IL (US); Thomas Kos, Orland Park, IL (US); Kurt Steven Goslovich, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 13/966,800

(22) Filed: Aug. 14, 2013

(65) Prior Publication Data

US 2015/0047938 A1    Feb. 19, 2015

(51) Int. Cl.
*F16F 9/36*      (2006.01)
*F16F 9/32*      (2006.01)

(52) U.S. Cl.
CPC ............... *F16F 9/366* (2013.01); *F16F 9/3271* (2013.01)

(58) Field of Classification Search
CPC .......... F16F 9/366; F16F 9/3271; F16F 9/364
USPC .......... 188/322.17, 322.16, 322.19, 286, 287; 267/64.11, 64.26, 120, 127, 136
See application file for complete search history.

(56) References Cited

U.S. PATENT DOCUMENTS

| | | | |
|---|---|---|---|
| 6,119,830 A | 9/2000 | Richardson et al. | |
| 6,446,944 B1 | 9/2002 | Ward et al. | |
| 7,413,063 B1* | 8/2008 | Davis | 188/267.1 |
| 2002/0020594 A1 | 2/2002 | Ward | |
| 2002/0111767 A1 | 8/2002 | Lueschow et al. | |
| 2010/0219572 A1* | 9/2010 | Back | 267/221 |
| 2014/0070468 A1* | 3/2014 | Leonard | 267/64.27 |

* cited by examiner

*Primary Examiner* — Pamela Rodriguez
(74) *Attorney, Agent, or Firm* — Miller, Matthias & Hull LLP

(57) ABSTRACT

Wear bands for heavy duty struts are disclosed. The wear bands include multiple layers such as a base metal layer sandwiched between an outer layer and an intermediate layer along with a solid lubricant layer disposed opposite the intermediate layer from the base metal layer. The outer layer engages an interior surface of the strut housing, which slidably accommodates a rod. The solid lubricant layer, which is the innermost layer, engages an outer surface of the rod so that the wear band is sandwiched between the rod and the housing and provides a solid lubricant layer for engaging the sliding rod.

11 Claims, 2 Drawing Sheets

STRUT WEAR BANDS

TECHNICAL FIELD

This disclosure relates to vehicle struts and the maintenance of vehicle struts. More specifically, this disclosure relates to heavy-duty struts and improved wear bands for heavy-duty struts, such as struts used in mining and construction vehicles or machines.

BACKGROUND

Many types of vehicles and machines include suspension struts to absorb and dampen transient forces imposed on the vehicle or machine as it travels over terrain. A typical suspension strut includes a rod and/or a piston that is slidably received within a housing (also known as a guide). Strut housings also include at least one cavity that contains a viscous fluid such as hydraulic fluid or oil. The fluid dampens movement of the rod within the housing. As the rod is retracted into the housing, fluid may exit the cavity through at least one orifice and, conversely, as the rod is extended, fluid may enter the cavity through the same or another orifice. The amount of damping provided by the strut can be adapted to the types of transient loads expected by increasing or decreasing the diameters of the orifices through which the fluid flows and/or by changing the viscosity of the fluid itself.

For large, off-road vehicles and machines, e.g., a mining truck, a typical front strut includes a hollow rod slidably received within an outer housing. A lower end of the rod may be attached to a spindle mount and the housing may be attached to the frame of the vehicle/machine. As the rod extends and retracts, harmful metal-to-metal contact may occur between the rod and the housing. To avoid this unwanted metal-to-metal contact, struts may include wear bands wrapped around the rod and disposed between the rod and the interior surface of the housing.

Strut wear bands may be subjected to two types of forces—elongation forces and compressive forces. Elongation forces are caused by axial sliding contact between the wear bands and the interior surface of the housing as the rod slides or floats within the housing. Compressive forces on the wear bands are caused by the wear bands being squeezed between the housing and the rod as the position of the rod relative to the housing shifts. These compressive forces are particularly problematic for large trucks using in mining, tar sands excavation and other operations that require the vehicle to traverse rugged terrain.

Currently, wear bands are made from polymeric materials such as a nylon, that may be cast or molded. However, it has been found that such polymeric materials do not have sufficient compressive strength properties and may fail before regular maintenance of the strut is scheduled. Because replacing the wear bands of a suspension strut is time consuming and therefore costly, improved wear bands are needed that have longer service lives. Wear bands with longer service lives would enable the wear bands to be replaced during regular maintenance of the strut and avoid the need for an additional maintenance procedure just to replace the wear bands.

SUMMARY

In one aspect, a suspension strut is disclosed that may include a hollow housing having an inner surface. The housing may slidably receive a rod. The rod may have an outer surface. The outer surface of the rod may be wrapped with at least one multiple-layer wear band. The wear band may therefore be sandwiched between the inner surface of the housing and the outer surface of the rod. The wear band may include an outer layer that engages the inner surface of the housing and an inner layer that engages the outer surface of rod. The wear band may further include a base metal layer sandwiched between the outer layer and an intermediate layer. The intermediate layer may be sandwiched between the base metal layer and the inner layer. The outer layer of the wear band may include a first metal or metal alloy, the base metal layer may include a second metal or metal alloy and the intermediate layer may include a third metal or metal alloy. The inner layer may include a solid lubricant.

In another aspect, a mining truck is disclosed. The truck may include a pair of front wheels. Each front wheel may be coupled to a strut. Each strut may include a housing having an inner surface. The housing may slidably receive a rod. The rod may have an outer surface. The outer surface of the rod may be wrapped with at least one wear band. The wear band may be sandwiched between the inner surface of the housing and the outer surface of the rod. The wear band may include an outer layer that engages the inner surface of the housing and an inner layer that engages the outer surface of rod. The wear band may further include a base metal layer sandwiched between the outer layer and an intermediate layer. The intermediate layer may be sandwiched between the base metal layer and the inner layer. The outer layer may include a first metal or metal alloy, the base metal layer may include a second metal or metal alloy and the intermediate layer may include a third metal or metal alloy. The inner layer may include a solid lubricant.

Another aspect of this disclosure includes a method for retrofitting an existing heavy duty strut of a vehicle with one or more disclosed wear bands. The strut includes a hollow housing with an inner surface that receives a rod with an outer surface. The strut further includes at least one prior art wear band sandwiched between the inner surface of the housing and the outer surface of the rod. The disclosed method may include uncoupling the existing strut from the vehicle and removing the rod from the housing. The method may further include removing the prior art wear band(s), and installing at least one disclosed wear band, wherein the disclosed wear band(s) may include an outer layer that engages the inner surface of the housing and an inner layer that engages the outer surface of rod. The wear band may further include a base metal layer sandwiched between the outer layer and an intermediate layer. The intermediate layer may be sandwiched between the base metal layer and the inner layer. The outer layer may include a first metal or metal alloy, the base metal layer may include a second metal or metal alloy and the intermediate layer may include a third metal or metal alloy. The inner layer may include a solid lubricant.

DESCRIPTION

Figure 1:
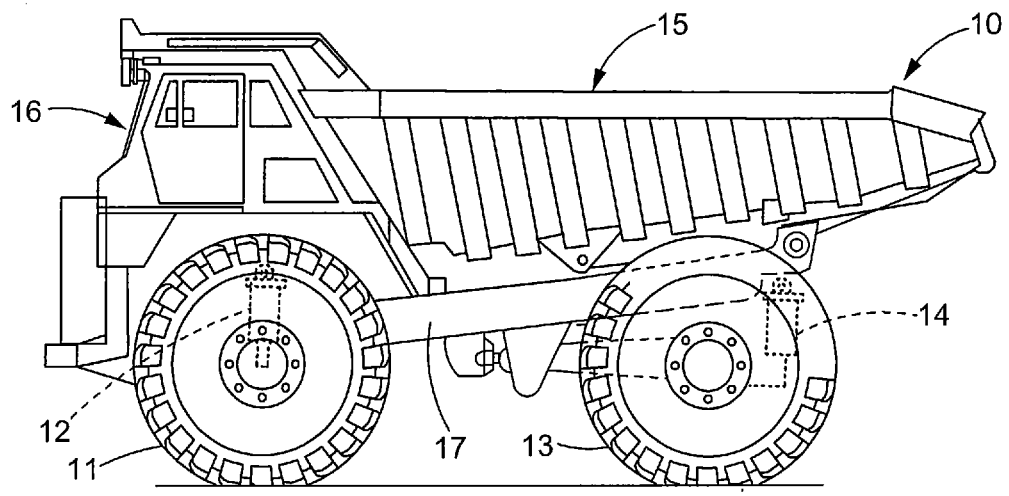
FIG. 1 is a diagrammatic view of an off-highway truck showing possible locations of front and rear struts.

FIG. 1 illustrates a vehicle 10, such as an off-highway truck. In FIG. 1, a front wheel 11 may be associated with a front strut 12. FIG. 1 also illustrates a rear wheel 13 that may be associated with a rear strut 14. The vehicle 10 may also include a load-carrying portion 15, a cab 16 and a frame 17. While this disclosure is directed primarily to front struts 12, those skilled in the art will realize that the principles described here are applicable to rear struts 14 as well. Further, this disclosure is not limited to the type of vehicle or truck 10 illustrated in FIG. 1.

Figure 2:
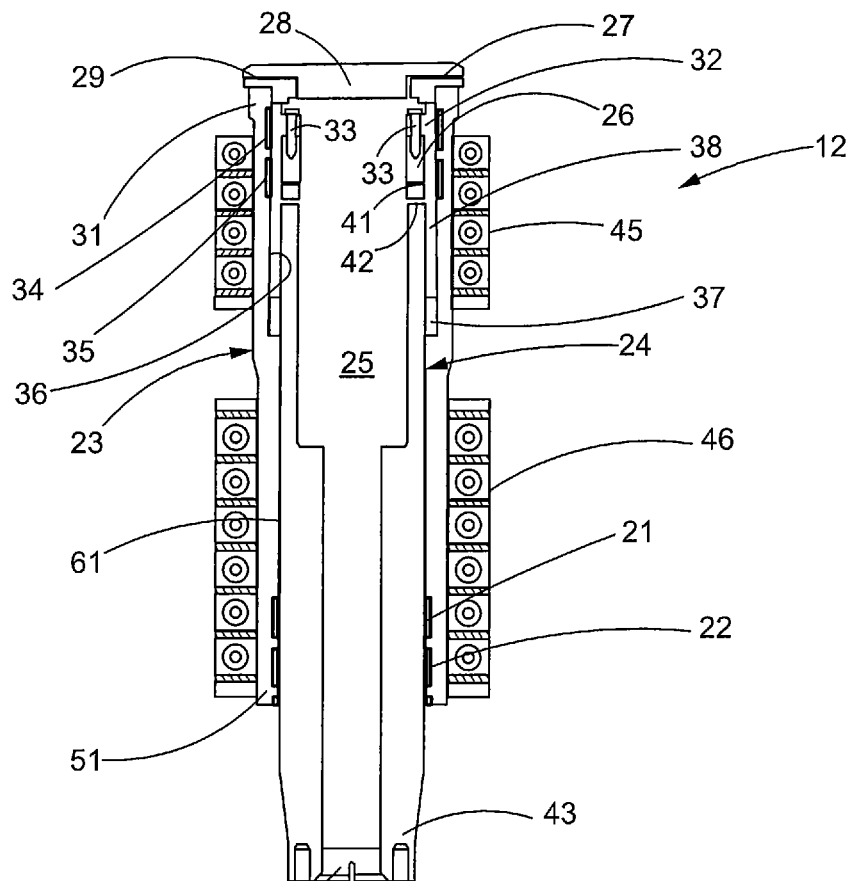
FIG. 2 is a sectional view of a disclosed strut and wear bands.

FIG. 2 illustrates a disclosed strut 12 that may include a pair of disclosed housing wear bands 21, 22. The strut 12 may include a housing 23 that is hollow or generally cylindrical in configuration as shown in FIG. 2 and that slidably accommodates a rod 24. The rod 24 may also be hollow and include a cavity 25, which may accommodate a fluid. Fluid may be introduced into the cavity 25 through the open proximal end 26 of the rod 24 which is in communication with the charge port 27 disposed in the head 28. The head 28 may also include an additional port 29, which may be in communication with a tire pressure monitoring system (TPMS). The head 28 encloses the open end 31 of the housing 23. The open end 26 of the rod 24 may be coupled to a support ring 32 that may be secured to the open end 26 of the rod 24 with one or more fasteners 33. The support ring 32 may accommodate one or more piston wear bands 34, 35 that slide against an interior surface 36 of the housing 23 as the rod 24 floats within the housing 23. The strut 12 may also include a gland wear band 37. The housing 23, rod 24, gland wear band 37, piston wear bands 34, 35 and support ring 32 may define an annular chamber 38 that may be in communication with the cavity 25 via one or more passageways 41, 42. Fluid may be provided to the annular chamber 38 primarily for lubrication purposes.

The end 43 of the rod 24 may be enclosed by a cap 44 and may further be connected to spindle mount (not shown). Similarly, the head 28 may be connected to an upper mount (also not shown). The housing 23 may also include one or more brackets 45, 46 that secure the housing 23 to the truck frame 17 (FIG. 1).

While the strut 12 includes three sets of wear bands including the housing wear bands 21, 22, the gland wear band 37 and the piston wear bands 34, 35, this disclosure is directed primarily to the housing wear bands 21, 22. The housing wear bands 21, 22 may be wrapped around the rod 24 as best seen in FIG. 3.

Figure 3:
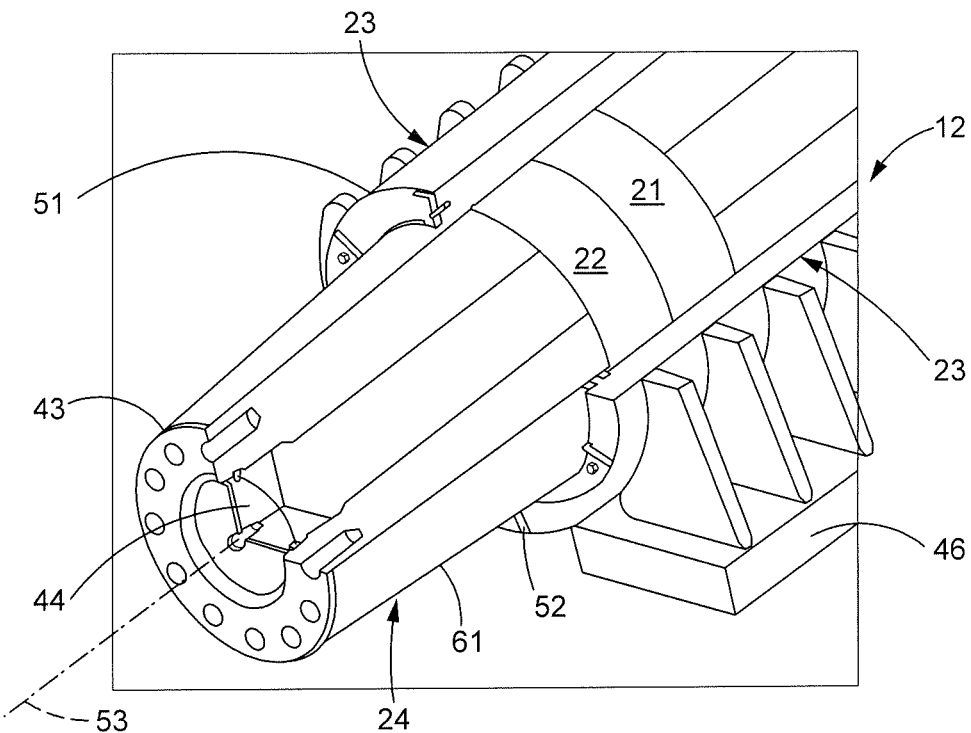
FIG. 3 is a partial perspective and sectional view of the strut shown in FIG. 2.

Still referring to FIG. 3, the end 51 of the housing 23 may be coupled to a retainer 52, which may prevent the wear bands 21, 22 from exiting the housing 23 upon extension of the rod 24. It has been found that the housing wear bands 21, 22 are subjected to both elongation forces and compressive forces. For example, the sliding action of the rod 24 inside the housing 23 will impose forces on the wear bands 21, 22 in directions parallel to the central axis 53 of the rod 24 and the housing 23. Further, when the vehicle 10 traverses rough terrain, such as in a mine or in a tar sands excavation site, compressive forces caused by a squeezing of the wear bands 21, 22 between the rod 24 and housing 23 will also occur. These compressive forces have been found to cause premature failure of the wear bands 21, 22, or failure of the wear bands 21, 22 before the strut 12 requires regularly scheduled maintenance. Currently used wear bands for heavy-duty struts require replacement after 4,000-5,000 hours of service. Both manufacturers and operators of machines or trucks 10 that utilize such wear bands desire the service life of a strut wear band to be much longer than 4,000-5,000 hours. To improve the service life housing wear bands used for heavy-duty struts 12, the disclosed wear bands 21, 22 may have a four-layer structure as illustrated in FIG. 4.

Figure 4:
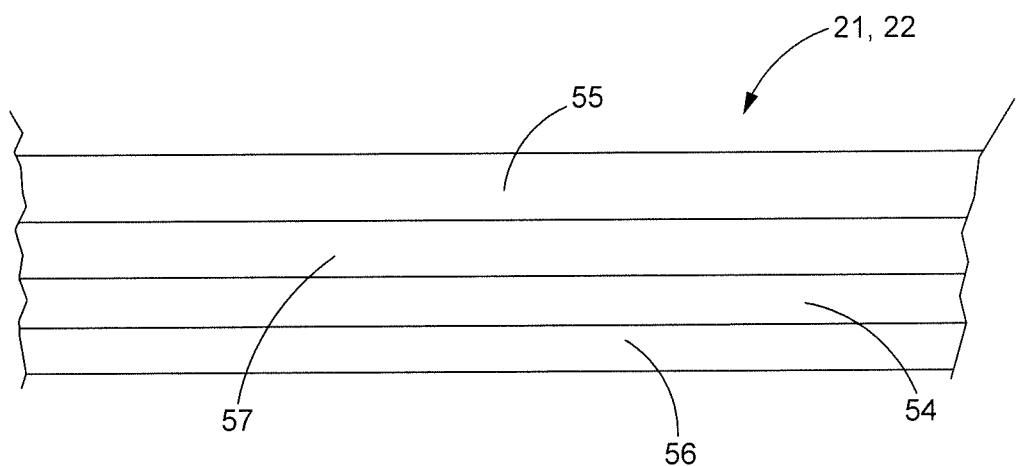
FIG. 4 is a partial sectional view illustrating the various layers of a disclosed wear band.

Turning to FIG. 4, the housing wear bands 21, 22 may include four layers including an outer layer 55, an inner layer 56, a base metal layer 57 and an intermediate layer 54 to form the composite structure shown in FIG. 4: outer layer 55/base metal layer 57/intermediate layer 54/inner layer 56. The outer layer 55 engages the interior surface 36 of the housing 23, which may present a rough surface. Thus, the outer layer 55 may be fabricated from a robust material, such a metal alloy. Suitable metal alloys for the outer layer 55 include, but are not limited to copper, copper alloys, various bronzes, brasses, aluminum, aluminum alloys and magnesium. In one aspect, the outer layer 55 and intermediate layer 54 may be fabricated from the same material or alloy.

In contrast, the inner layer 56 engages the outer surface 61 of the rod 24 (see FIG. 3). Because the outer surface 61 of the rod 24 may be smoother than the inner surface of the housing 23 and must slide axially within the housing 23, the inner layer 56 may be fabricated from a less robust material, such as a solid lubricant. One suitable solid lubricant material is PTFE (polytetrafluoroethylene). Other suitable solid lubricant materials may include, but are not limited to fluorinated ethylene-propylene copolymer, ethylene-tetrafluoroethylene copolymer graphite, molybdenum disulfide, boron nitride, tungsten disulfide, talc, calcium fluoride, cerium fluoride and combinations thereof.

The employment of an intermediate layer 54 is suggested to provide a transition between the base metal layer 57, which may be a steel or other iron-based alloy, and the inner layer 56, which may be a solid lubricant, e.g., PTFE. Suitable materials for fabricating the intermediate layer 54 include copper, copper alloys and bronzes. The material used for the intermediate layer 54 may be the same as the material used for the outer layer 55.

In one non-limiting example, the housing wear bands 21, 22 may include an outer layer 55 of bronze, a base metal layer 57 of steel, an intermediate layer 54 of bronze and an inner layer 56 of PTFE. Of course, various other alloys may be used for the outer layer 55 and the intermediate layer 54 other than bronzes or copper alloys. For example, other alloys that may be used for the outer and intermediate layers 55, 54 include aluminum, various steels or iron-based alloys, various brass alloys and magnesium.

Various means for providing a base metal layer 57, coating the base metal layer 57 with the outer layer 55, the intermediate layer 54 and then coating the intermediate layer 54 with an inner layer 56 will be apparent to those skilled in the art.

INDUSTRIAL APPLICABILITY

Currently, wear bands disposed between a rod and a housing of a strut are fabricated from cast or molded polymeric materials, such as nylon. However, because such polymeric materials do not provide sufficient resistance to compression forces, an improved wear band is disclosed which includes four layers including an outer metal layer, a base metal layer, an intermediate layer and an inner solid lubricant layer. The outer and intermediate layers may be bronze or other suitable alloy(s). The solid lubricant may be PTFE or another suitable material that may be easily coated onto the intermediate layer. The base metal layer may be a steel, although other suitable alloys will be apparent to those skilled in the art. The multi-layer structure provides wear bands that will need replacing less frequently or that may be replaced during other regularly scheduled maintenance of the strut. For example, the disclosed wear bands have service lives in excess of 10,000 hours or at least twice that of existing nylon wear bands. Thus, improved wear bands for struts are disclosed as well as improved struts and vehicles and machines incorporating said struts.

The invention claimed is:

1. A method of retrofitting a heavy-duty strut with an improved wear band, the method comprising:
   providing the strut that includes a hollow housing having an inner surface, the housing slidably receiving a rod, the rod having an outer surface, the outer surface of the rod wrapped with at least one existing wear band;
   removing the existing wear band;
   installing a multiple layer wear band in place of the removed existing wear band, the multiple layer wear band including an outer layer for engaging the inner surface of the housing, an inner layer for engaging the outer surface of the rod, a base metal layer and an intermediate layer with that base metal layer disposed between the outer layer and the intermediate layer and with the intermediate layer disposed between the base metal layer and the inner layer; and
   wherein the outer layer includes a first metal, the base metal layer includes a second metal, the intermediate layer includes a third metal and the inner layer includes a solid lubricant.

2. The method of claim 1 wherein the second metal includes steel.

3. The method of claim 1 wherein the first and third metals include bronze.

4. The method of claim 1 wherein the first and third metals are the same.

5. The method of claim 1 wherein the solid lubricant layer includes polytetrafluoroethylene.

6. The method of claim 1 wherein the base metal layer is harder than the intermediate and outer layers.

7. The method of claim 6 wherein the second metal includes steel and the first and third metals include bronze.

8. The method of claim 7 wherein the solid lubricant is polytetrafluoroethylene.

9. A mining truck, comprising:
   a pair of front wheels;
   each front wheel coupled to a strut;
   each strut including
      a hollow housing having an inner surface;
      the housing slidably receiving a rod, the rod having an outer surface;
      the outer surface of the rod wrapped with at least one wear band, wherein the wear band is sandwiched between the inner surface of the housing and the outer surface of the rod;
      the wear band including an outer layer that engages the inner surface of the housing, the wear band further including an inner layer that engages the outer surface of the rod, the wear band further including a base metal layer and an intermediate layer with the base metal layer disposed between the outer layer and the intermediate layer and the intermediate layer is disposed between the base metal layer and the inner layer; and
      wherein the outer layer includes a first metal, the base metal layer includes a second metal, the intermediate layer includes a third metal, the inner layer includes a solid lubricant and the second metal is harder than the first metal.

10. The truck of claim 9 wherein the second metal is a steel alloy and the first and third metals are bronze.

11. The truck of claim 9 wherein the solid lubricant layer is selected from the group consisting of polytetrafluoroethylene, fluorinated ethylene-propylene copolymer, ethylene-tetrafluoroethylene copolymer, graphite, molybdenum disulfide, boron nitride, tungsten disulfide, talc, calcium fluoride, cerium fluoride and combinations thereof.

* * * * *